(12) United States Patent
Buckley et al.

(10) Patent No.: US 11,273,750 B2
(45) Date of Patent: Mar. 15, 2022

(54) CARGO HOLD CLAMP ASSEMBLY FOR A PICKUP TRUCK CARGO BED

(71) Applicant: ABC TECHNOLOGIES INC., Toronto (CA)

(72) Inventors: Ian W. Buckley, Toronto (CA); Timothy J. Miron, Barrie (CA); Samuel F. Parker, Waterloo (CA); Olga O. Sementsova, Etobicoke (CA)

(73) Assignee: ABC TECHNOLOGIES INC., Toronto (CA)

( * ) Notice: Subject to any disclaimer, the term of this patent is extended or adjusted under 35 U.S.C. 154(b) by 323 days.

(21) Appl. No.: 16/379,653

(22) Filed: Apr. 9, 2019

(65) Prior Publication Data

US 2019/0308550 A1    Oct. 10, 2019

Related U.S. Application Data

(60) Provisional application No. 62/655,033, filed on Apr. 9, 2018.

(51) Int. Cl.
*B60P 7/08*       (2006.01)
*B62D 33/027*    (2006.01)

(52) U.S. Cl.
CPC ........ *B60P 7/0807* (2013.01); *B62D 33/0273* (2013.01)

(58) Field of Classification Search
CPC .. B60P 7/0807; B60R 9/06; B60R 2011/0071; B62D 33/0273
USPC ......... 410/34, 101, 102, 104, 106, 110, 116, 410/120, 155
See application file for complete search history.

(56) References Cited

U.S. PATENT DOCUMENTS

| | | | | |
|---|---|---|---|---|
| 3,283,973 | A * | 11/1966 | Wargo | B62D 43/02 |
| 6,494,445 | B1 * | 12/2002 | Bellis, Jr. | B25B 5/006 |
| 2007/0170217 | A1 * | 7/2007 | Lemoine | B60P 7/10 410/100 |
| 2010/0239383 | A1 * | 9/2010 | Toutant | F16B 2/10 410/77 |

FOREIGN PATENT DOCUMENTS

DE        102016119205     *   4/2017

* cited by examiner

*Primary Examiner* — Stephen T Gordon
(74) *Attorney, Agent, or Firm* — Medler Ferro Woodhouse & Mills PLLC

(57) ABSTRACT

Provided is a cargo hold assembly for use in a cargo bed of a pickup truck. The cargo hold assembly comprises a base configured to be mounted to a side-wall portion of the cargo bed; and a clamping assembly pivotally mounted to the base. The clamping assembly provides a clamp mechanism including a top clamp arm and a bottom clamp arm, wherein the top clamp arm is moveable relative to the bottom clamp arm to permit the engagement and retention of cargo therebetween.

20 Claims, 4 Drawing Sheets

CARGO HOLD CLAMP ASSEMBLY FOR A PICKUP TRUCK CARGO BED

CROSS-REFERENCE TO RELATED APPLICATION

The present application claims the benefit of prior U.S. Application No. 62/655,033, filed 9 Apr. 2018, the contents of which are incorporated by reference herein.

FIELD OF THE INVENTION

The present invention pertains to the field of cargo holders, in particular to a cargo holder for use in the cargo bed of a pickup truck.

BACKGROUND

The current increase in the utilization of the pickup truck as a means of transportation also sees the vehicle used for non-commercial uses. In addition to the conventional use where pickup trucks were used for transporting construction goods (i.e. sand, bags of cement, shovels, lumber and other equipment), the current market sees a much broader utilization of this cargo space. While lumber and building supplies are the staple of the DIY industry, pickup trucks see a much broader utilization, with the cargo box being used to move just about anything, including but not limited to skis, bikes, camping gear and all sorts of sporting goods. One common struggle with the cargo bed of a pickup truck is that its vast space makes it difficult to manage placement and retention of goods while in transport. Bags of groceries fail over and the contents slide and roll around the inside of the bed. Large items contained in the cargo box can move around with considerable force, increasing the chance of damage to both the goods and the truck itself.

There is a need for a simple, easily adjustable cargo management system for use with a truck bed and which will allow items contained in the cargo bed to be safely retained during transport.

SUMMARY OF THE INVENTION

According to an aspect of the disclosure, provided is a cargo hold assembly for use in a cargo bed of a pickup truck. The cargo hold assembly comprises a base configured to be mounted to a side-wall portion of the cargo bed; and a clamping assembly pivotally mounted to the base. The clamping assembly provides a clamp mechanism including a top clamp arm and a bottom clamp arm, wherein the top clamp arm is moveable relative to the bottom clamp arm to permit the engagement and retention of cargo therebetween.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Figure 1:
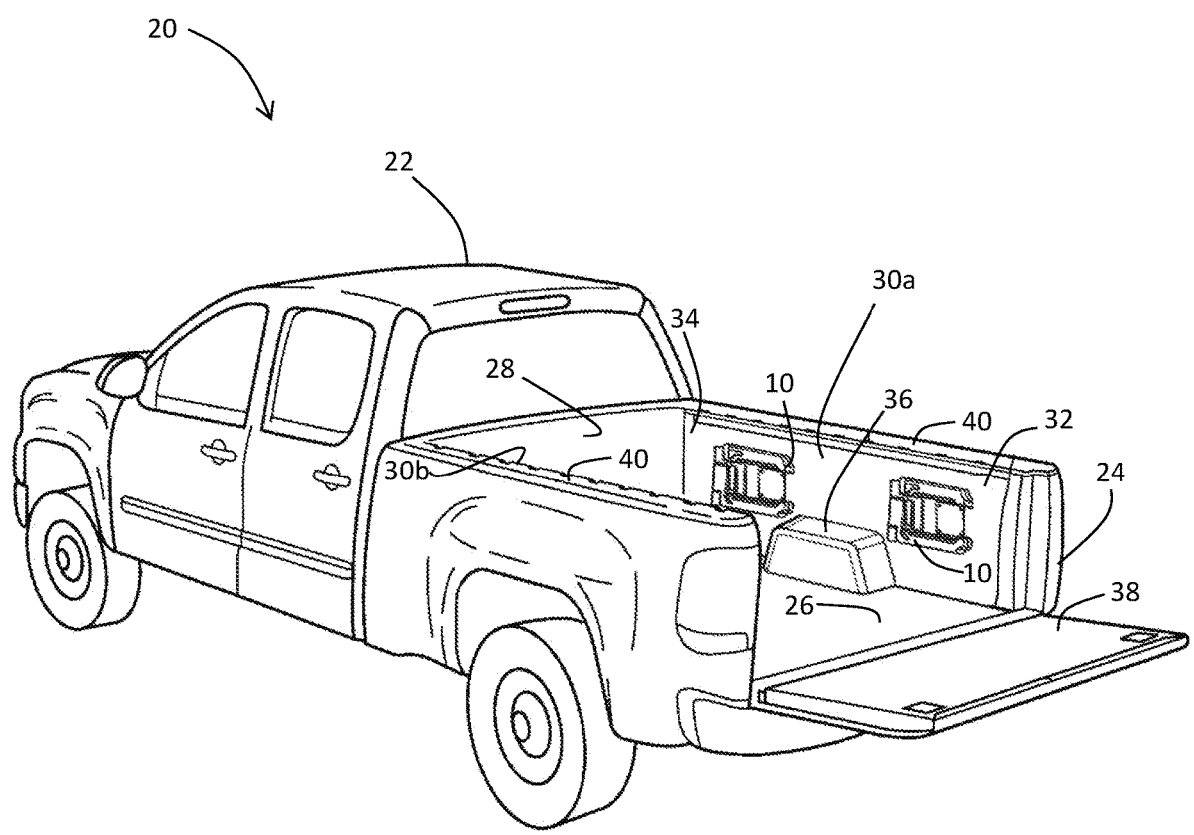
FIG. 1 is a perspective view of a pickup truck.
Figure 2:
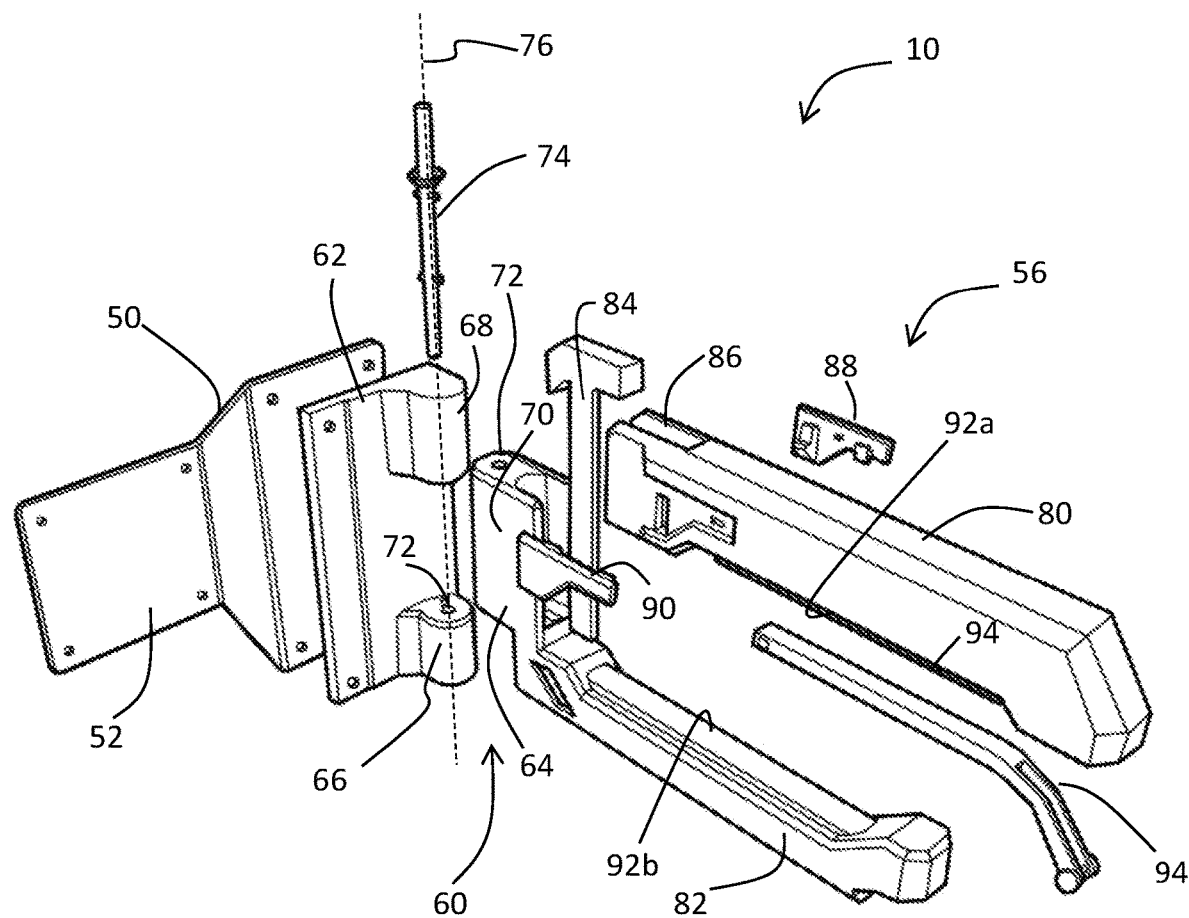
FIG. 2 is an exploded perspective view of the cargo hold assembly according to an embodiment of the invention.

Specific embodiments of the present invention will now be described with reference to the figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field or the following detailed description.

It should be noted that in the description, terms such as forward, front and derivations of these terms are intended to mean or refer to an orientation directed towards, or a location situated towards the front of the vehicle or component in question relative to its orientation within a vehicle. Similarly, terms such as rearward, rear and derivations of these terms are intended to mean or refer to an orientation directed towards, or a location situated towards the back of the vehicle or component in question relative to its orientation within a vehicle. Terms such as up, upper, upward, and derivations of these terms are intended to mean or refer to an orientation that is above or on a top-side of the vehicle or component in question relative to its orientation within a vehicle. Terms such as lower, down, downward, and derivations of these terms are intended to mean or refer to an orientation that is below or on a bottom-side of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards the longitudinal centerline of the vehicle, or component in question relative to its orientation within a vehicle.

In addition, the terms "in particular", "for example", and similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Referring now to FIG. 1, shown is a pickup truck 20 having a cab 22 and a cargo bed 24 situated rearward therefrom. The cargo bed 24 comprises a floor 26, an upstanding forward wall 28 immediately adjacent and rearward of the cab 22, and two upstanding opposing side-wall sections 30a, 30b. Each side wall section 30a, 30b includes a first side-wall portion 32 and a second side-wall portion 34, the first and second side-wall portions 32, 34 being separated by a wheel well 36. Opposite to the forward wall 28 towards the rear of the cargo bed 24 is situated a tailgate 38. The tailgate 38 is provided with a hinge assembly (not shown) permitting the tailgate 38 to pivot from a generally vertical/upright closed position, to a generally horizontal open position as required by the operator. As shown, the tailgate 38 is in the open position. The forward wall 28 and the two opposing side wall sections 30a, 30b define an upper wall surface that is generally planar. The upper wall surface is collectively regarded as the bed rail 40.

Referring now to FIGS. 2 to 5, shown is a cargo hold assembly 10. The cargo hold assembly 10 is configured to be mounted upon the side wall sections 30a, 30b of the cargo bed 24, in particular the areas defined by the first and second side-wall portions 32, 34. Depending on the intended purpose and required functionality, a cargo bed 24 may contain a single cargo hold assembly 10, or a plurality of cargo hold assemblies 10. In general, the cargo hold assemblies 10 may be installed as pairs, for example upon the first and second side-wall portions 32, 34 of one, or both of, the side wall sections 30a, 30b. To simplify the description which follows, the cargo hold assembly 10 will be described with reference to being mounted upon the first side wall portion 32 of the side wall section 30a.

The cargo hold assembly 10 includes a base 50 that is configured to be mounted to the first side wall portion 32 of the side wall section 30a of the cargo bed 24. The base 50 includes a mount plate 52 to facilitate attachment of the base 50 to a receiving surface, in this case the first side wall portion 32. The mount plate 52 is configured to cooperate with one or more fasteners (i.e. threaded fasteners) to mount the base 50 to the receiving surface, although other mounting means may be suitably implemented. Although the exemplary embodiment shows a mount plate 52 for attachment using suitable fasteners, in other embodiments a 'press-fit' installation may be used. For example, in some embodiments, the base may include a telescoping fixture that permits it to be securely mounted between the cargo bed 24 and the underside of the bed rail 40, without the use of fasteners and the requirement to drill holes in the cargo bed. The telescoping fixture may be spring actuated, or otherwise configured to establish a frictional fit between the upper and lower ends of the telescoping fixture and the corresponding receiving surfaces, namely the underside of the bed rail and the cargo bed, therein retaining the base in position.

Figure 3:
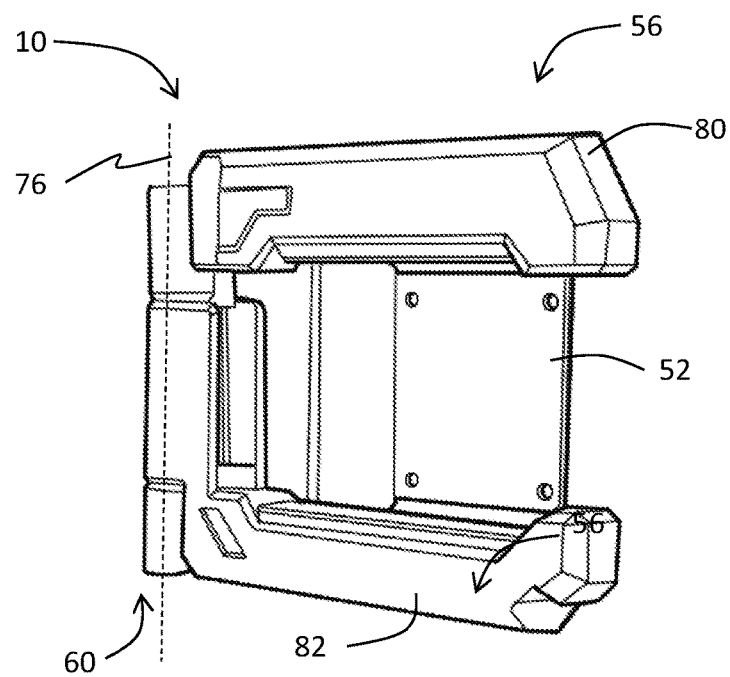
FIG. 3 is a perspective view of a cargo hold assembly according to the embodiment of FIG. 2, showing the cargo hold assembly in the stowed (first) position, and where the clamping assembly is shown in the open position.
Figure 4:
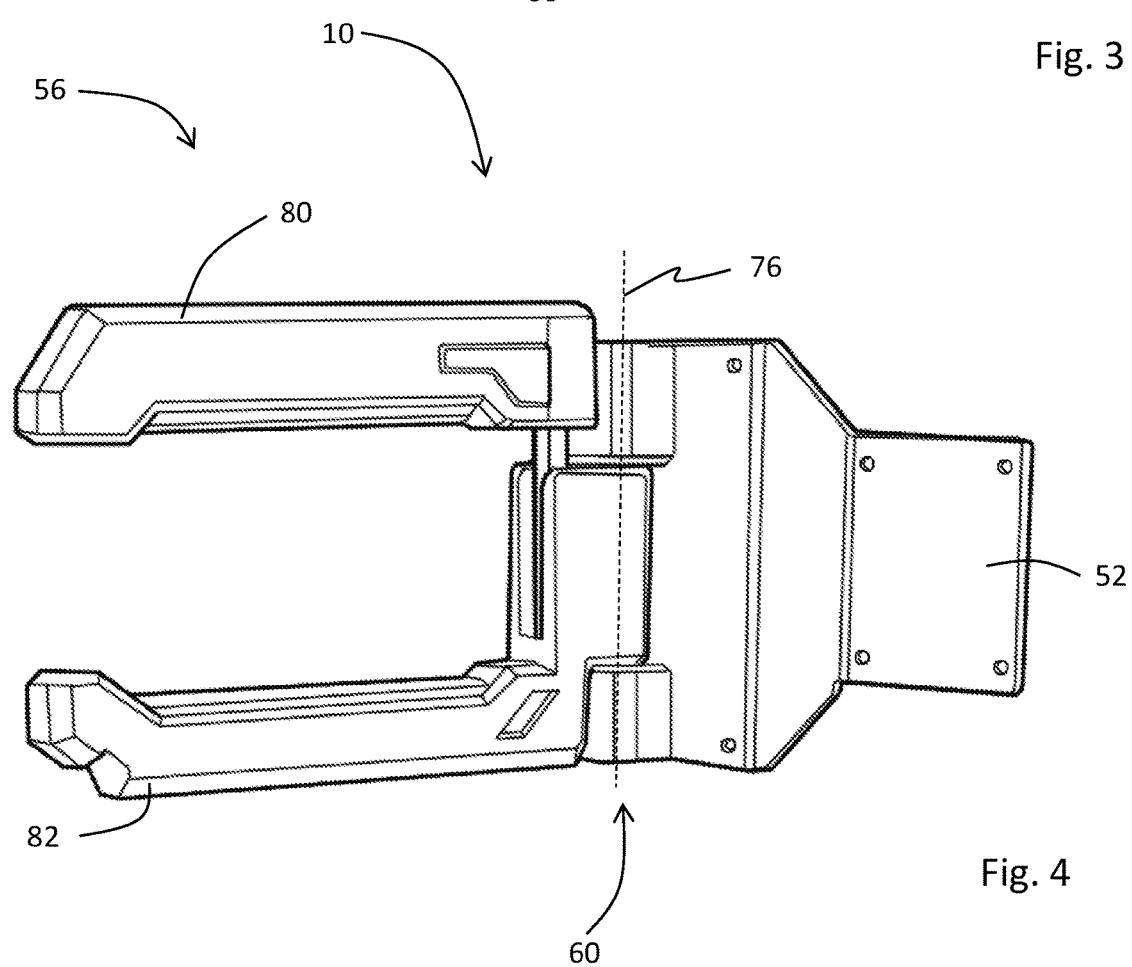
FIG. 4 is a perspective view of the cargo hold assembly according to the embodiment of FIG. 2, showing the cargo hold assembly in an outwardly directed (second) position, and where the clamping assembly is shown in the open position.

The base 50 supports a clamping assembly 56 pivotally mounted to the base 50 through a hinge assembly 60. The hinge assembly 60 permits the clamping assembly 56 to pivot through a range of operable positions, ranging from a first position as shown in FIG. 3, through to a second position as shown in FIG. 4. The clamping assembly 56 is usable at the first and second positions, and any position therebetween. Although not shown, the hinge assembly 60 may incorporate a lock that enables a user to select a defined position of the clamping assembly 56 relative to the base 50. For example, a preferred position for use of the clamping assembly 56 has the clamping assembly 56 positioned at about 90° relative to the base 50 (as shown in FIG. 4).

The hinge assembly 60 includes a first hinge component 62 and a second hinge component 64. The first hinge component 62 is mounted upon the base 50, and remains stationary relative thereto. In some embodiments, the first hinge component 62 may be integrally formed with the base, but in the embodiment shown, the first hinge component 62 is separately formed and fixedly attached to the base 50. The first hinge component 62 may be fixedly attached to the base 50 using suitable fasteners (i.e. threaded fasteners), or it may be fixedly attached to the base 50 using a welded attachment.

The second hinge component 64 pivots relative to the first hinge component 62, permitting the clamping assembly 56 to pivot through the range of operable positions. As shown, the first hinge component 62 provides a pair of first hinge barrels 66, 68, spaced apart to define an intermediate region dimensioned to receive a second hinge barrel 70 of the second hinge component 64. Each of the first hinge barrels 66, 68 and the second hinge barrel 70 include an aperture 72 that receives a hinge pin 74 to define a pivot axis 76 of the second hinge component 64 relative to the first hinge component 62.

Figure 5:
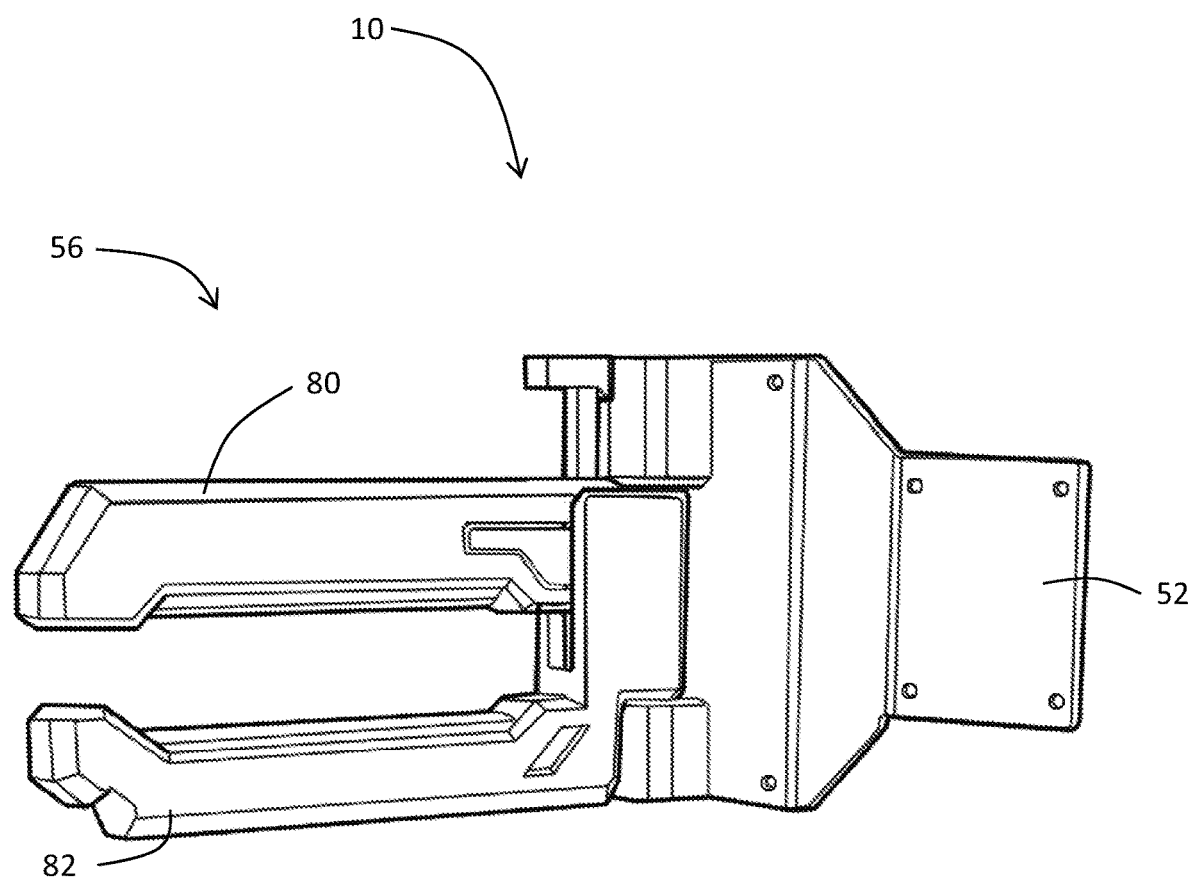
FIG. 5 is a perspective view of the cargo hold assembly according to the embodiment of FIG. 2, showing the cargo hold assembly in the outwardly directed (second) position, and where the clamping assembly is shown in the closed position.

The second hinge component 64 also serves to support the clamping mechanism of the clamping assembly 56. The clamping mechanism includes a top clamp arm 80 and a bottom clamp arm 82 where the top clamp arm 80 is moveable relative to the stationary bottom claim arm 82 from a first open position, as shown in FIG. 4, and a second closed position, as shown in FIG. 5. It will be appreciated that the bottom clamp arm 82 is considered stationary relative to the second hinge component 64, but is pivotally moveable as part of the clamping assembly 56.

As shown, the stationary bottom clamp arm 82 is fixedly attached to the second hinge component 64. The bottom clamp arm 82 may be an integrally formed with the second hinge component 64, or it may be separately formed and fixedly attached thereto using a suitable fastener or welded attachment. The second hinge component 64 and the bottom clamp arm 82 cooperatively support a clamp rail 84 which in turn guides and supports the top clamp arm 80. The top clamp arm 80 includes an aperture 86 dimensioned to receive the clamp rail 84, and further to moveably displace upon the clamp rail 84 between the first and second operable positions.

The top clamp arm 80 includes a rail lock 88 to enable the user to releasably lock the top clamp arm 80 at a select location on the clamp rail 84 between the first and second operable positions. While a variety of lock mechanisms could be implemented for the rail lock 88, in some embodiments the rail lock 88 will include a releasable rail binding element (not shown) comprising an engagement member that engages the clamp rail 84 to prevent movement upon the rail when in the locked position. The rail lock 88 includes an actuator lever 90 that permits the user to engage/disengage the rail lock 88 as required.

The top and bottom clamp arms 80, 82 are elongate structures, designed to hold/support a variety of cargo. The top clamp arm 80 provides a top cargo binding surface 92a, while the bottom clamp arm 82 provides a bottom cargo binding surface 92b. The top and bottom cargo binding surfaces 92a, 92b are directed inwardly towards each other, therein providing a clamping environment upon downward displacement of the top clamp arm 80 upon cargo being supported by the clamping assembly 56. As shown, the top and bottom cargo binding surfaces 92a, 92b are generally linear/planar surfaces, although a contoured surface on one, or both of, the top and bottom cargo binding surfaces is possible. In some embodiments, the top and bottom cargo binding surfaces 92a, 92b include a cargo supporting liner 94, which may be a rubber or similar performing material designed to support and/or securely retain cargo with minimal shifting within the clamping assembly 56.

Materials

The cargo hold assembly, and the components that establish the overall structural integrity of the assembly, for example the base and the clamping assembly components, may be manufactured from any suitable material including, but not limited to metals and plastics.

Suitable metals may include, but are not limited to:
1. Mild Steel (sheet/tubing)—painted, powder coated
2. Zinc-plated steel (Fasteners)
3. Stainless Steel (Sheet/tubing/fasteners)
4. Aluminum (tubing/channels)—anodized
5. Spring Steel Suitable plastics may include, but are not limited to:
1. Polypropylene (PP)—(glass-filled, or carbon-fiber filled)
2. Nylon/Polyamide (PA) (11, 12, 6, 66)—(glass-filled, or carbon-fiber filled)
3. High-density polyethylene (HDPE)
4. Acrylonitrile butadiene styrene (ABS)
5. Acrylonitrile butadiene styrene/polycarbonate (ABS-PC)
6. ethylene propylene diene monomer (EPDM)
7. polypropylene-ethylene propylene diene monomer (PP-EPDM)
8. TPE (thermoplastic Elastomers)

The use of plastics may be further enhanced using fillers, including but not limited to natural fibers, glass fiber, virgin and/or recycled carbon fiber, colours/dyes, as well as fillers that confer UV resistance and/or chemical resistance. It will be appreciated that the cargo hold assembly may be manufactured from a combination of materials, for example where the base is formed of a metal material, while portions of the clamping assembly components are formed of a plastic material. Contact surfaces that are intended to grip and retain cargo may be provided with rubber or rubber-like materials to prevent slipping or dislodgement during use.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A cargo hold assembly for use in a cargo bed of a pickup truck, the cargo hold assembly comprising:
    a base configured to be mounted to a side-wall portion of the cargo bed; and
    a clamping assembly including a top clamp arm and a bottom clamp arm, the clamping assembly pivotally mounted to the base through a hinge assembly that permits the clamping assembly to pivot between a first position and a second position, wherein each of the top clamp arm and the bottom clamp arm is an elongate structure that extends adjacent to and parallel with the side-wall portion of the cargo bed when in the first position and wherein each of the top clamp arm and the bottom clamp arm do not extend adjacent to and parallel with the side-wall portion of the cargo bed when in the second position, and
    wherein the top clamp arm is moveable relative to the bottom clamp arm to permit the engagement and retention of cargo therebetween.

2. The cargo hold assembly according to claim 1, wherein the hinge assembly permits the clamping assembly to move relative to the base through a range of operable positions between the first position and the second position.

3. The cargo hold assembly according to claim 1, wherein the hinge assembly includes a lock that is configured to enable a user to select a defined position of the clamping assembly relative to the base.

4. The cargo hold assembly according to claim 1, wherein the hinge assembly includes a first hinge component and a second hinge component, the first hinge component being mounted upon the base and remaining stationary relative thereto, while the second hinge component pivots relative to the first hinge component, the second hinge component supporting the clamping assembly and permitting the clamping assembly to pivot through a range of operable positions between the first position and the second position.

5. The cargo hold assembly according to claim 4, wherein the first hinge component provides a pair of spaced-apart first hinge barrels, and wherein the second hinge component provides a second hinge barrel, the second hinge barrel being received between the pair of spaced-apart first hinge barrels, the pair of first hinge barrels and the second hinge barrel being arranged to receive a hinge pin.

6. The cargo hold assembly according to claim 4, wherein the bottom clamp arm is fixedly attached to the second hinge component.

7. The cargo hold assembly according to claim 6, wherein the second hinge component and the bottom clamp arm support a clamp rail which guides and supports the top clamp arm through a range of motions from an open position to a closed position.

8. The cargo hold assembly according to claim 7, wherein the top clamp arm includes a rail lock to permit the top clamp arm to be releasably locked upon the clamp rail at a select location between the first open position and the closed position.

9. The cargo hold assembly according to claim 1, wherein the top and bottom clamp arms each provide a cargo binding surface.

10. The cargo hold assembly according to claim 9, wherein the cargo binding surface is formed of rubber.

11. A cargo hold assembly for use in a cargo bed of a pickup truck, the cargo hold assembly comprising:
    a base configured to be mounted to a side-wall portion of the cargo bed; and
    a clamping assembly including a bottom clamp arm, a top clamp arm moveable relative to the bottom clamp arm, and a clamp rail extending between the bottom clamp arm and the top clamp arm, the top clamp arm including an aperture configured to receive the clamp rail therethrough such that the top clamp arm is slidable relative to the clamp rail between an open position and a closed position, wherein the top clamp arm and the bottom clamp arm are configured to clamp upon downward displacement of the top clamp arm relative to the bottom clamp arm from the open position to the closed position, wherein the clamping assembly is pivotally mounted to the base through a hinge assembly that permits the clamping assembly to pivot between a first position and a second position, wherein each of the top clamp arm and the bottom clamp arm is an elongate structure that extends adjacent to and parallel with the side-wall portion of the cargo bed when in the first position and wherein each of the top clamp arm and the bottom clamp arm do not extend adjacent to and parallel with the side-wall portion of the cargo bed when in the second position.

12. The cargo hold assembly according to claim 11, wherein the bottom clamp arm defines a bottom cargo binding surface and the top clamp arm defines a top cargo binding surface, the bottom cargo binding surface and the top cargo binding surface being directed inwardly towards each other, wherein each of the bottom cargo binding surface and the top cargo binding surface is a planar surface.

13. The cargo hold assembly according to claim 12, wherein each of the bottom cargo binding surface and the top cargo binding surface includes a cargo supporting liner formed of rubber.

14. The cargo hold assembly according to claim 11, wherein the hinge assembly includes a lock that is configured to enable a user to select a defined position of the clamping assembly relative to the base.

15. The cargo hold assembly according to claim 11, wherein the hinge assembly includes a first hinge component and a second hinge component, the first hinge component being mounted upon the base and remaining stationary relative thereto, while the second hinge component pivots relative to the first hinge component, the second hinge component supporting the clamping assembly and permitting the clamping assembly to pivot through a range of operable positions between the first position and the second position.

16. The cargo hold assembly according to claim 15, wherein the first hinge component provides a pair of spaced-apart first hinge barrels, and wherein the second hinge component provides a second hinge barrel, the second hinge barrel being received between the pair of spaced-apart first hinge barrels, the pair of first hinge barrels and the second hinge barrel being arranged to receive a hinge pin.

17. The cargo hold assembly according to claim 15, wherein the bottom clamp arm is fixedly attached to the second hinge component.

18. The cargo hold assembly according to claim 11, wherein the top clamp arm includes a rail lock to permit the top clamp arm to be releasably locked upon the clamp rail at a select location between the open position and the closed position.

19. A cargo hold assembly for use in a cargo bed of a pickup truck, the cargo hold assembly comprising:
a base configured to be mounted to a side-wall portion of the cargo bed;
a hinge assembly including a first hinge component and a second hinge component, the first hinge component being mounted upon the base and remaining stationary relative thereto, while the second hinge component pivots relative to the first hinge component; and
a clamping assembly including a bottom clamp arm which is fixedly attached to the second hinge component, a top clamp arm moveable relative to the bottom clamp arm, and a clamp rail extending between the bottom clamp arm and the top clamp arm, the top clamp arm including an aperture configured to receive the clamp rail therethrough such that the top clamp arm may slide relative to the clamp rail between an open position and a closed position, wherein the top clamp arm and the bottom clamp arm are configured to clamp upon downward displacement of the top clamp arm relative to the bottom clamp arm from the open position to the closed position, and wherein the clamping assembly is pivotally mounted to the base through the hinge assembly that permits the clamping assembly to pivot between a first position and a second position, wherein each of the top clamp arm and the bottom clamp arm is an elongate structure that extends adjacent to and parallel with the side-wall portion of the cargo bed when in the first position and wherein each of the top clamp arm and the bottom clamp arm does not extend adjacent to and parallel with the side-wall portion of the cargo bed when in the second position.

20. The cargo hold assembly according to claim 19, wherein the bottom clamp arm defines a bottom cargo binding surface and the top clamp arm defines a top cargo binding surface, the bottom cargo binding surface and the top cargo binding surface being directed inwardly towards each other, wherein each of the bottom cargo binding surface and the top cargo binding surface is a planar surface.

* * * * *